(12) United States Patent
Tomalin (10) Patent No.: US 8,067,689 B2
(45) Date of Patent: Nov. 29, 2011

(54) EDM WIRE

(75) Inventor: Dandridge Tomalin, Chagrin Falls, OH (US)

(73) Assignee: Composite Concepts Company, Mason, OH (US)

( * ) Notice: Subject to any disclaimer, the term of this patent is extended or adjusted under 35 U.S.C. 154(b) by 303 days.

(21) Appl. No.: 12/281,433

(22) PCT Filed: Nov. 29, 2006

(86) PCT No.: PCT/US2006/045562
§ 371 (c)(1), (2), (4) Date: Sep. 2, 2008

(87) PCT Pub. No.: WO2007/064646
PCT Pub. Date: Jun. 7, 2007

(65) Prior Publication Data
US 2009/0025959 A1    Jan. 29, 2009

Related U.S. Application Data

(60) Provisional application No. 60/741,423, filed on Dec. 1, 2005, provisional application No. 60/854,772, filed on Oct. 27, 2006.

(51) Int. Cl.
*H01B 11/06* (2006.01)
(52) U.S. Cl. .......................................................... 174/36
(58) Field of Classification Search .................... 174/36, 174/125.1, 125.2, 126.1, 126.2
See application file for complete search history.

(56) References Cited

U.S. PATENT DOCUMENTS

| | | | |
|---|---|---|---|
| 2,378,458 A | 6/1945 | Avallone | |
| 2,392,456 A | 1/1946 | Brown et al. | |
| 2,918,722 A | 12/1959 | Kenmore | |
| 4,055,445 A * | 10/1977 | Pops | 148/554 |
| 4,287,404 A | 9/1981 | Convers et al. | |
| 4,304,113 A | 12/1981 | Takei et al. | |
| 4,341,939 A | 7/1982 | Briffod et al. | |
| 4,424,432 A | 1/1984 | Kaneko et al. | |
| 4,640,747 A | 2/1987 | Ueno et al. | |
| 4,686,153 A * | 8/1987 | Tominaga et al. | 428/610 |
| 4,740,666 A * | 4/1988 | Tomalin et al. | 219/69.12 |

(Continued)

FOREIGN PATENT DOCUMENTS
EP     376248     4/1990
(Continued)

OTHER PUBLICATIONS

Dr. Phil. Max Hansen prepared with cooperation of Dr. Rer. Nat. Kurt Anderko Constitution of Binary Alloys, 1958; pp. 649-655.

*Primary Examiner* — William H Mayo, III
(74) *Attorney, Agent, or Firm* — Tarolli, Sundheim, Covell & Tummino LLP (57) ABSTRACT

An EDM wire having an outer coating of gamma phase brass with an overlayer of continuous unalloyed zinc or ductile epsilon phase brass entrapping the gamma phase and a process for manufacturing the EDM wire is provided. A second process for synthesizing a ductile epsilon phase brass coating on the aforementioned and other substrates is also provided. The first process includes coating a copper bearing metallic core with zinc. The zinc coating is then converted to gamma phase brass via a diffusion anneal and subsequently re-coated with zinc prior to being cold drawn to its finish diameter.

26 Claims, 5 Drawing Sheets

U.S. PATENT DOCUMENTS

| | | | |
|---|---|---|---|
| 4,924,050 A | 5/1990 | Hermanni | |
| 4,935,594 A | 6/1990 | Groos et al. | |
| 4,977,303 A | 12/1990 | Briffod | |
| 4,988,552 A | 1/1991 | Tomalin | |
| 5,196,665 A | 3/1993 | Briffod | |
| 5,762,726 A | 6/1998 | Barthel et al. | |
| 5,808,262 A | 9/1998 | Mukherjee | |
| 5,858,136 A * | 1/1999 | Briffod | 148/639 |
| 5,945,010 A * | 8/1999 | Tomalin | 219/69.12 |
| 6,306,523 B1 | 10/2001 | Seong | |
| 6,447,930 B2 * | 9/2002 | Barthel et al. | 428/621 |
| 6,482,535 B2 | 11/2002 | Seong | |
| 6,566,622 B1 | 5/2003 | Barthel et al. | |
| 6,781,081 B2 * | 8/2004 | Groos et al. | 219/69.12 |
| 2007/0295695 A1 * | 12/2007 | Tomalin | 219/69.15 |

FOREIGN PATENT DOCUMENTS

| | | |
|---|---|---|
| GB | 2069396 | 8/1981 |
| JP | 56-126528 | 3/1981 |
| JP | 58059736 | 4/1983 |
| JP | 58160019 | 9/1983 |
| JP | 59129626 | 7/1984 |
| JP | 60249528 | 10/1985 |
| JP | 61136733 | 6/1986 |
| JP | 62218026 | 9/1987 |
| JP | 62246425 | 10/1987 |
| JP | 1210222 | 8/1989 |
| KR | 541225-1449211 | 7/1997 |
| WO | WO 99/06183 | 11/1999 |

* cited by examiner

EDM WIRE

Related Applications

This application claims priority from International Application No. PCT/US06/45562, filed Nov. 29, 2006, which corresponds with U.S. Provisional Application No. 60/854,772, filed Oct. 27, 2006, and U.S. Provisional Application No. 60/741,423, filed Dec. 1, 2005, the entirety of which are incorporated herein by reference.

TECHNICAL FIELD

This invention relates to electrical discharge machining (EDM) and specifically to an electrode wire to be used in discharge machining and to a process for manufacturing an EDM electrode wire.

BACKGROUND OF THE INVENTION

The process of electrical discharge machining (EDM) is well known. In the field of traveling wire EDM, an electrical potential (voltage) is established between a continuously moving EDM wire electrode and an electrically conductive workpiece. The potential is raised to a level at which a discharge is created between the EDM wire electrode and the workpiece. The intense heat generated by the discharge will melt and/or vaporize a portion of both the workpiece and the wire to thereby remove, in a very small increment, a piece of the workpiece. By generating a large number of such discharges a large number of increments are removed from the workpiece whereby the workpiece can be cut very exactly to have a desired planar contour. A dielectric fluid is used to establish the necessary electrical conditions to initiate the discharge and to flush debris from the active machining area.

The residue resulting from the melting and/or vaporization of a small increment (volume) of the surface of both the workpiece and the EDM wire electrode is contained in a gaseous envelope (plasma). The plasma eventually collapses under the pressure of the dielectric fluid. The liquid and the vapor phases created by the melting and/or vaporization of material are quenched by the dielectric fluid to form solid debris. The cutting process therefore involves repeatedly forming a plasma and quenching that plasma. This process will happen sequentially at nanosecond intervals at many spots long the length of the EDM wire.

It is important for flushing to be efficient because, if flushing is inefficient, conductive particles build up in the gap which can create the potential for electrical arcs. Arcs are very undesirable as they cause the transfer of a large amount of energy that causes large gouges or craters, i.e. metallurgical flaws, to be introduced into the workpiece and the EDM wire electrode. Such flaws in the wire could cause the EDM wire to break catastrophically.

An EDM wire must possess a tensile strength that exceeds a desired threshold value to avoid tensile failure of the wire electrode induced by the preload tension that is applied, and should also possess a high fracture toughness to avoid catastrophic failure induced by the flaws caused by the discharge process. Fracture toughness is a measure of the resistance of a material to flaws which may be introduced into the material and which can potentially grow to the critical size that could cause catastrophic failure of the material. The desired threshold tensile strength for an EDM wire electrode is thought to be in the range 60,000 to 90,000 psi (414 to 620 $N/mm^2$).

It is known in the prior art to use an EDM wire electrode with a core composed of a material having a relatively high mechanical strength with a relatively thin metallic coating covering the core and comprising at least 50% of a metal having a low volumetric heat of sublimation such as zinc, cadmium, tin, lead, antimony, bismuth or an alloy thereof. Such a structure is disclosed is U.S. Pat. No. 4,287,404 which discloses a wire having a steel core with a coating of copper or silver which is then plated with a coating of zinc or other suitable metal having a low volumetric heat of sublimation.

It is also known from the prior art, for instance from U.S. Pat. No. 4,686,153, to coat a copper clad steel wire with zinc and thereafter to heat the zinc coated wire to cause interdiffusion between the copper and zinc to thereby convert the zinc layer into a copper zinc alloy. That patent describes the desirability of a beta phase alloy layer for EDM purposes. The copper zinc has a concentration of zinc of about 45% by weight with the concentration of zinc decreasing radially inward from the outer surface. The average concentration of zinc in the copper zinc layer is less than 50% by weight but not less than 10% by weight. The surface layer therefore includes beta phase copper-zinc alloy material at the outer surface since beta phase copper zinc alloy material has a concentration of zinc ranging between 40%-50% by weight. While this patent recognized that a copper-zinc alloy layer formed by means of a diffusion anneal process could potentially contain epsilon phase (approximately 80% zinc content), gamma phase (approximately 65% zinc content), beta phase (approximately 45% zinc content), and alpha phase (approximately 35% zinc content), the patent asserted that the preferred alloy material is beta phase in the coating.

Others in the prior art, for instance U.S. Pat. No. 5,762,726, recognized that the higher zinc content phases in the copper-zinc system, specifically gamma phase, would be more desirable for EDM wire electrodes, but the inability to cope with the brittleness of these phases limited the commercial feasibility of manufacturing such wire.

This situation changed with the technology disclosed in U.S. Pat. No. 5,945,010. By employing low temperature diffusion anneals, the inventor was able to incorporate brittle gamma phase particles in a coating on various copper containing metallic substrates. However due to the brittle characteristics of the gamma phase brass alloy, the resultant microstructure is characterized by a discontinuous coating where the substrate material is exposed to the gap at these discontinuities. Therefore, the inferior cutting properties of the substrate, as compared to gamma phase brass alloy will retard the overall performance of the wire in proportion to the amount of substrate area exposed and the relative cutting performance of the gamma phase alloy and the exposed substrate material. The '010 patent found epsilon phase to be too unstable to be incorporated in the resultant high zinc content alloy coating, although the potential for a brittle epsilon coating was acknowledged.

There have been a number of attempts to combine the benefits of several coating materials by constructing multi-layered coatings. Examples of these attempts can be found in U.S. Pat. Nos. 6,306,523, 6,566,622 and U.S. Pat. No. 6,781,081. All of the multi-layered constructions disclosed in these patents containing gamma phase brass are subject to the same limitation that a single layered gamma phase brass suffers from, the brittleness of the gamma phase creates a discontinuous layer that is exposed to the workpiece, even when the gamma phase is covered by an additional layer.

SUMMARY OF THE INVENTION

The present invention provides an EDM wire including an outer coating of gamma phase brass with an overlayer of continuous unalloyed zinc or ductile epsilon phase brass entrapping the gamma phase thereby filling in any discontinuities thereby presenting a surface with homogeneous electrical properties to the workpiece and a process for making such a wire.

The invention comprises in one form thereof, an EDM wire with a core of a metal, an alloy of a metal, or a composite structure of layered metals or alloys and having at least some copper in or near an outer surface. For purposes of explanation, this core construction will be termed "copper bearing". Surrounding this "copper bearing" core is a substantially continuous coating of unalloyed zinc or epsilon phase brass alloy in which is dispersed discrete particles of gamma phase brass alloy.

The invention, in another form thereof, comprises an EDM wire with a copper bearing core of a metal, an alloy of a metal, or a composite structure of layered metals or alloys and a substantially continuous coating of epsilon phase brass where the substrate composition is not exposed on the entire circumference of the wire.

The invention also comprises a process for manufacturing EDM wire with a copper bearing core and a substantially continuous coating of unalloyed zinc in which is dispersed discrete particles of gamma phase brass alloy. The process comprises coating a copper bearing core with zinc, and converting the zinc to gamma phase brass with a low temperature heat treatment in a non-oxidizing atmosphere. Subsequently, an additional coating of zinc is deposited on the gamma phase brass alloy coating and the composite is drawn to its finish diameter. The zinc coating is ductile and will flow into the voids created when the gamma phase fractures due to its inability to plastically deform. The wire can be annealed to adjust the mechanical properties of the wire to the desired level. Alternatively, the unalloyed zinc coating can be converted to ductile epsilon phase brass at the finished diameter or the intermediate diameter by performing a diffusion anneal under extremely low temperature conditions that allow the epsilon phase to be formed under stable conditions. If the epsilon conversion is performed at an intermediate diameter, the coated wire may then be cold drawn to a finish diameter.

The invention, in another form thereof, comprises an EDM wire with a copper bearing core of a metal, an alloy of a metal, or a composite structure of layered metals or alloys, and a continuous coating of porous epsilon phase brass wherein said porous coating has been infiltrated with graphite particles and where the core composition is not exposed on the entire circumference of the wire.

An advantage of the present invention is that a surface with uniform properties is presented to the workpiece when the erosion process commences. For a "rough cut" where speed is of most interest and accuracy is of lesser importance, any zinc or epsilon phase brass covering underlying gamma phase brass alloy particles will quickly be consumed because it will be proportionately thinner than that filling in gaps between the gamma particles, thereby exposing the high performance gamma coating. For the gap areas filled in with zinc or epsilon phase, either of these compositions will be higher performing and a closer approximation to the properties of the gamma phase than the substrate material which would otherwise be exposed. For a "skim pass" (a low gap voltage pass to accurately remove controlled amounts of the workpiece thereby producing the desired workpiece dimension) either an unalloyed zinc or an epsilon phase continuous coating will have more uniform discharge potential producing better control over the metal removal process which must be closely controlled to insure accuracy.

Another advantage of the invention is that a continuous epsilon coating provides a coating which is performance competitive with continuous beta phase brass or discontinuous gamma phase brass coatings at a lower manufacturing cost than either of the other high zinc content alloy brass coatings.

BRIEF DESCRIPTION OF THE DRAWINGS

The features and advantages of this invention will become more apparent and the invention will be better understood by reference to the following description of an embodiment of the invention taken in conjunction with the accompanying figures, wherein.

DETAILED DESCRIPTION

In general, EDM wire will cut more efficiently if it contains a surface with a higher zinc content on that eroding surface. For instance a zinc coated brass alloy wire will cut more efficiently than an uncoated brass alloy wire. However, the melting point of the coating is an important factor in determining the efficiency of any given coating's performance. Since unalloyed zinc has a relatively low melting point of 420° C., alloyed coatings with higher melting points (e.g. beta, gamma, or epsilon phase brass alloy coatings) but with lower zinc contents can outperform unalloyed zinc coatings in some applications. The higher melting points of these alloys delays them from being removed from the eroding surface by the mechanical and hydraulic forces imposed upon it, and therefore a higher zinc content is available on the surface when it is needed for further erosion. Unfortunately these higher zinc content alloy phases tend to be brittle and therefore are difficult and/or expensive be included on hard drawn EDM wires as continuous coatings.

The brass alloy phases commonly applicable to EDM wires are alpha phase, beta phase, gamma phase, and epsilon phase. Of the brass alloy phases, alpha phase has the highest melting point (approximately 910° C. at its highest commercially feasible zinc content of 35-37 weight percent), beta phase has the next highest melting point (approximately 890° C. in a diffusion annealed coating with a typical 45 weight percent zinc content), gamma phase has the next highest melting point (approximately 800° C. in a diffusion annealed coating with a typical 65 weight percent zinc content), and epsilon phase has the lowest melting point (approximately 550° C. in a diffusion annealed coating with a typical 85 weight percent zinc content).

As the zinc content of these alloy phases increases, the ductility of the phases decreases proportionately and hence the resulting wire becomes more difficult to draw without damaging the coating. The ability to cold draw EDM wire is important because EDM wire needs to have an elevated tensile strength to sustain the tensile loads that are imposed on the wire to keep them accurately located as the process proceeds. Because of their relatively low zinc content, beta phase coatings have been successfully applied to EDM wires, even though they are brittle enough that a full sectioned beta phase wire would be difficult to cold draw. Gamma phase coatings are even more brittle than beta phase coatings, and in point of fact, they are often so brittle that they produce discontinuous coatings where islands of gamma phase become embedded in the wire surface after being cold drawn. However even though the coating does not cover the full wire surface, the increased zinc content of the surface is enough that gamma phase coatings have been shown to outperform beta phase coatings. Conventionally processed, epsilon phase coatings are even more brittle than gamma phase. In addition to the brittleness limitation, epsilon phase is very unstable making it difficult to control the process of converting a zinc coating to epsilon phase in a manner similar to that used for converting a zinc coating to gamma phase.

The invention herein disclosed provides a process that allows the discontinuities present in brittle gamma phase coatings to be filled in with unalloyed zinc which is ductile enough to flow into these discontinuities and fill them with a material that has better flushing characteristics than the copper bearing substrate. Although the lower melting point of zinc is generally considered to be a disadvantage of zinc coatings when compared to the alloy coatings, zinc still has value in filling in the discontinuities in the gamma phase because (1) it is ductile enough to be cold drawn and (2) it requires no heat treatment which potentially would convert the relatively unstable gamma phase to a less efficient form. The invention also discloses a process capable of converting such a zinc coating to a ductile form of epsilon phase brass which allows the higher melting point of the epsilon to be taken advantage of. In addition since the inventive process of forming epsilon phase may produce a ductile product capable of being cold drawn, the epsilon phase can be applied to any substrate, including those not containing gamma phase brass, thereby resulting in a more efficient coating produced at a lower manufacturing cost than other diffusion annealed coatings (e.g. beta or gamma phase brass).

In the following example, EDM wire was produced with a finish diameter of 0.25 mm by the outlined process.

EXAMPLE 1

Figure 1:
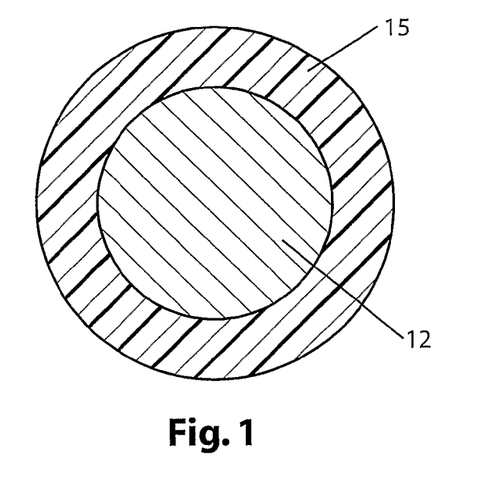
FIGS. 1-4 are cross sectional views of EDM wire constructed in accordance with an embodiment of the present invention.
Figure 2:
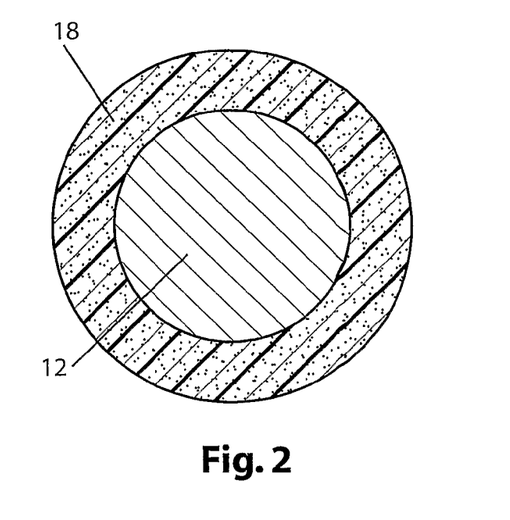
Figure 3:
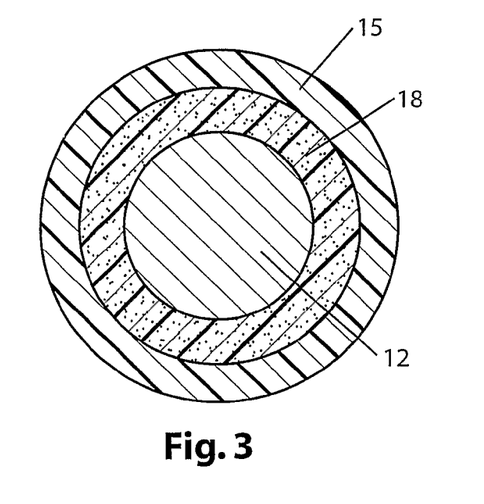
Figure 4:
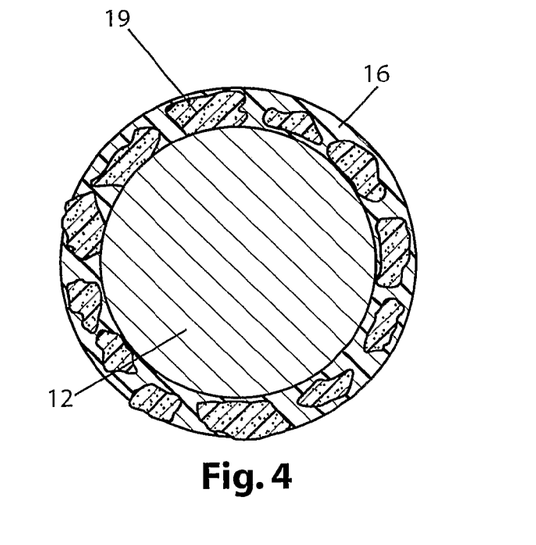

Core: 60 Cu/40Zn
Electroplate 10 μm of zinc at 0.9 mm diameter
Heat Treatment Temperature: 170° C. for 6 hours in nitrogen atmosphere
Electroplate 10 μm of zinc
Cold drawn from 0.9 mm to 0.25 mm Referring to FIG. 1, a high brass core 12 is covered with a zinc coating 15 having an initial thickness of 10 μm. After heat treatment at 170° C. for 6 hours in a nitrogen atmosphere, the wire is depicted in FIG. 2, with a gamma phase brass coating 18 on the high brass core 12. Since a non-oxidizing atmosphere of nitrogen gas was employed during the heat treatment, the wire can be electroplated again with a zinc coating 15 having a thickness of 10 μm as depicted in FIG. 3 where the gamma coating 18 and high brass core 12 are the same as depicted in FIG. 2. Cold drawing the composite wire to its finish diameter of 0.25 mm causes the brittle gamma phase to fracture and form discrete particles 19 as depicted in FIG. 4. However the zinc coating 16 is ductile enough to flow around these particles and encapsulate them on the high brass core 12.

Figure 5:
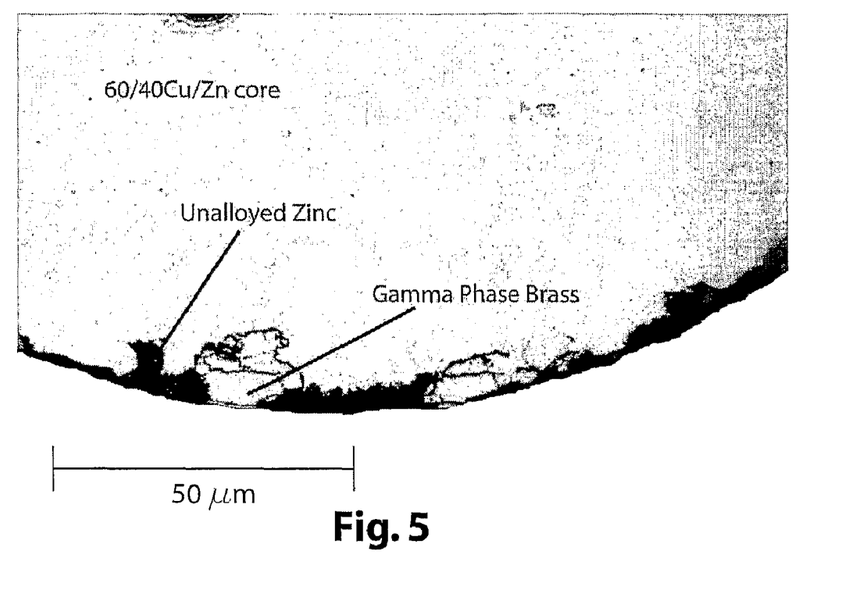
FIG. 5 is an optical photomicrograph of a cross section of the copper bearing core and a substantially continuous coating of unalloyed zinc in which is dispersed discrete particles of gamma phase brass alloy processed as described in Example 1.

FIG. 5 illustrates a cross section view of the wire produced in Example 1 as examined in an optical microscope. Features of the photomicrograph are labeled such that they can be compared to the schematic structure described in FIG. 4.

Figure 6A:
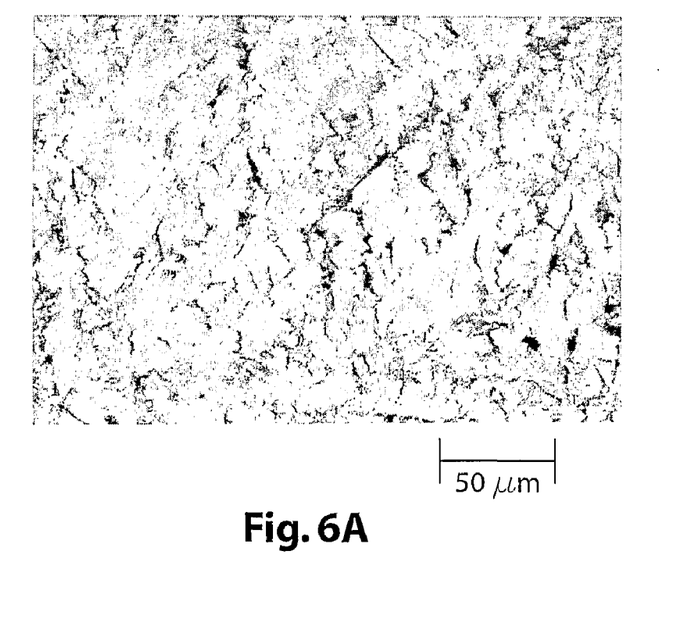
FIG. 6 is a scanning electron photomicrograph of a profile view of a wire with a gamma phase coating processed in the conventional manner of the '010 process (FIG. 5a) as compared to the profile view a wire with a copper bearing core and a substantially continuous coating of unalloyed zinc in which is dispersed discrete particles of gamma phase brass alloy processed as described in Example 1 (FIG. 5b)
Figure 6B:
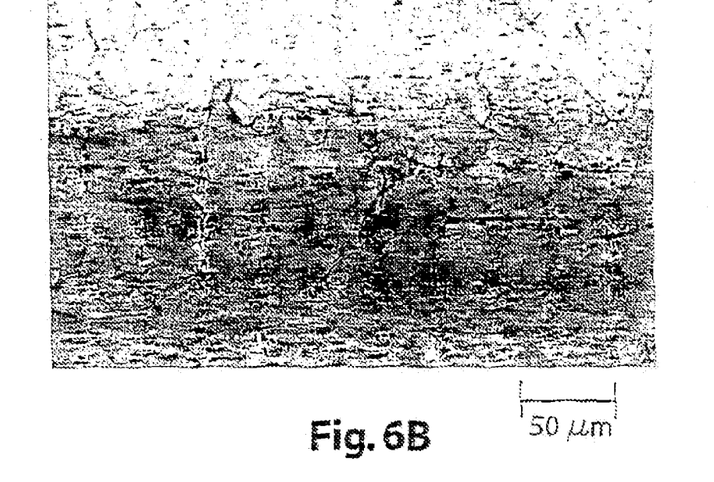

FIG. 6 illustrates the profile view of the (a) inventive wire as compared to (b) a conventionally processed gamma coated wire where both wires are viewed on a Scanning Electron Microscope (SEM). The conventionally processed gamma coated wire employed the same process as Example 1 except the second zinc electroplate step after the gamma conversion heat treatment was omitted. This is essentially the same process as described in the prior art of U.S. Pat. No. 5,945,010. In profile, the discontinuities in the conventionally processed gamma phase coating appear as surface fissures. Since most of these discontinuities have been filled in with zinc the inventive wire, there are far fewer of the distinctive fissure like surface features observed in its profile as illustrated by FIG. 6(b).

It should be noted that the term "core" used throughout the description of the present invention is intended to denote the most general description of that portion of the wire that lies below the outer surface layer which may be composed of one or more distinctive metallurgical phases. The term "core" is not limited to a homogenous metal or alloy and may include a layered or stratified structure such as beta phase brass layer on a copper clad steel substrate. For example, the "core" may contain two layers covering a homogenous substrate, but other more complex structures containing multiple components are also contemplated. According to the invention, the core substrate preferably includes copper at or near its outer surface. Thus, a variety of substrate materials are contemplated by the present invention. These contemplated substrate materials include, but are not limited to, pure copper, brass, brass on copper, copper clad steel, brass on copper clad steel, brass clad steel, and brass on brass (e.g., high zinc content brass on lower zinc content brass). More specific examples include unalloyed copper with a layer of beta phase brass on its surface, a homogenous single phase brass alloy, a homogenous single phase brass alloy with a layer of beta phase brass on its surface and a copper clad steel with a layer of beta phase brass on its surface. All of these core constructions are contemplated by the present invention. For purposes of explanation, the core construction contemplated by the present invention shall be termed "copper bearing".

The invention herein described also allows the outer zinc coating to be converted to epsilon phase brass in a controlled manner thereby allowing the higher melting point of the alloy phase to be taken advantage of. Such coatings can be employed as previously described to fill in the gaps of discontinuous gamma phase coatings or applied to other substrates to take advantage of their improved characteristics. Since these coatings are processed at lower diffusion anneal temperatures than previously attempted (50° C.-140° C.), it has been discovered that zinc coatings can be converted to epsilon phase at very low temperatures where the epsilon phase is very stable. At these low temperatures, the process can be precisely controlled such that the metallurgical structure (and therefore the mechanical properties) of the wire is not modified and the resulting epsilon phase is ductile.

The lower melting point of the epsilon phase is generally considered to be a disadvantage of epsilon phase coatings when compared to beta or gamma phase coatings. However, the higher zinc content of the epsilon phase has been found to offset that disadvantage such that epsilon phase coatings have been found to match the performance of beta phase coatings while being competitive with the performance of gamma phase coatings. Therefore, the epsilon phase coating provides similar cutting performance while having a lower cost to manufacture than either beta or gamma phase. Infiltrating the porous epsilon phase coating with graphite, e.g. by drawing the wire in a lubricant composed of a suspension of fine graphite particles in an aqueous medium, can further improve the performance of an epsilon phase coating.

In the following example, EDM wire was produced with a finish diameter of 0.25 mm and at a starting size and heat treatment as described.

EXAMPLE 2

Figure 7:
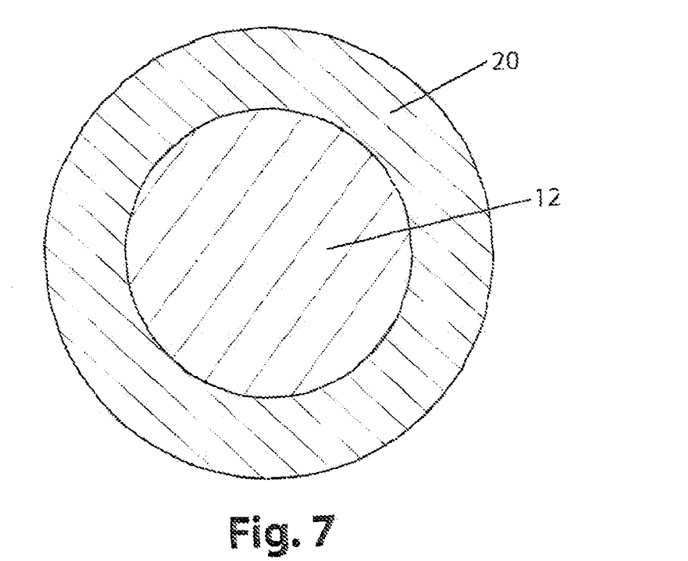
FIG. 7 is a cross sectional view of an EDM wire after a diffusion anneal constructed in accordance with an embodiment of the present invention.

Core: 65 Cu/35Zn; electroplated 10 μm of zinc at 0.9 mm diameter
  Cold drawn from 0.9 mm to 0.25 mm
  Annealing Temperature: 70° C.
  Annealing Time: 20 hours (air cool)
  Referring to FIG. 1, a high brass core 12 is covered with a zinc coating 15 having an initial thickness of 10 μm. After cold drawing and heat treatment, the wire is depicted in FIG. 7, with an epsilon phase brass coating 20 having a thickness that is less than or equal to the initial zinc thickness. Since the zinc is not converted to epsilon phase until after the wire has been work hardened by cold deformation, the tensile strength of the wire electrode can be increased to a level suitable for EDM wire electrodes by cold drawing prior to heat treatment. By converting the zinc coating to epsilon phase at the finish diameter using a very low temperature for diffusion annealing (less than approximately 120 C.) it is possible to avoid altering the metallurgical structure of the core material or materials. Also, since the epsilon phase is not deformed by wire drawing, the coating remains uniform and covers substantially all of the wire surface.

It is also believed that the ductility of the epsilon phase formed at such low temperatures is ductile enough to allow the heat treated wire to be drawn again to a finish diameter while maintaining a substantially continuous coating of epsilon phase, thereby further improving the effectiveness of the coating. The added drawing step may create a non-uniform thickness in the coating due to the anisotropy of the coating's properties.

Figure 8:
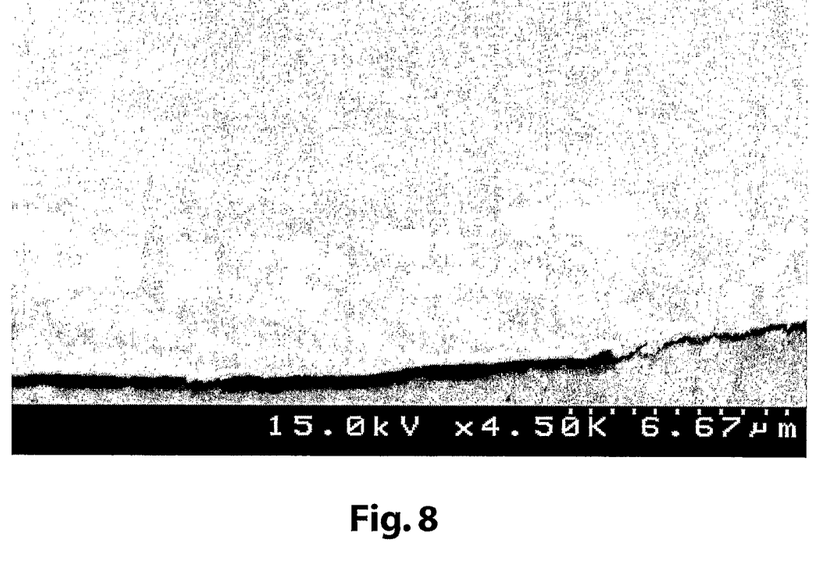
FIG. 8 is a scanning electron photomicrograph of a cross section of a wire with an epsilon phase coating processed as described in Example 2.
Figure 9:
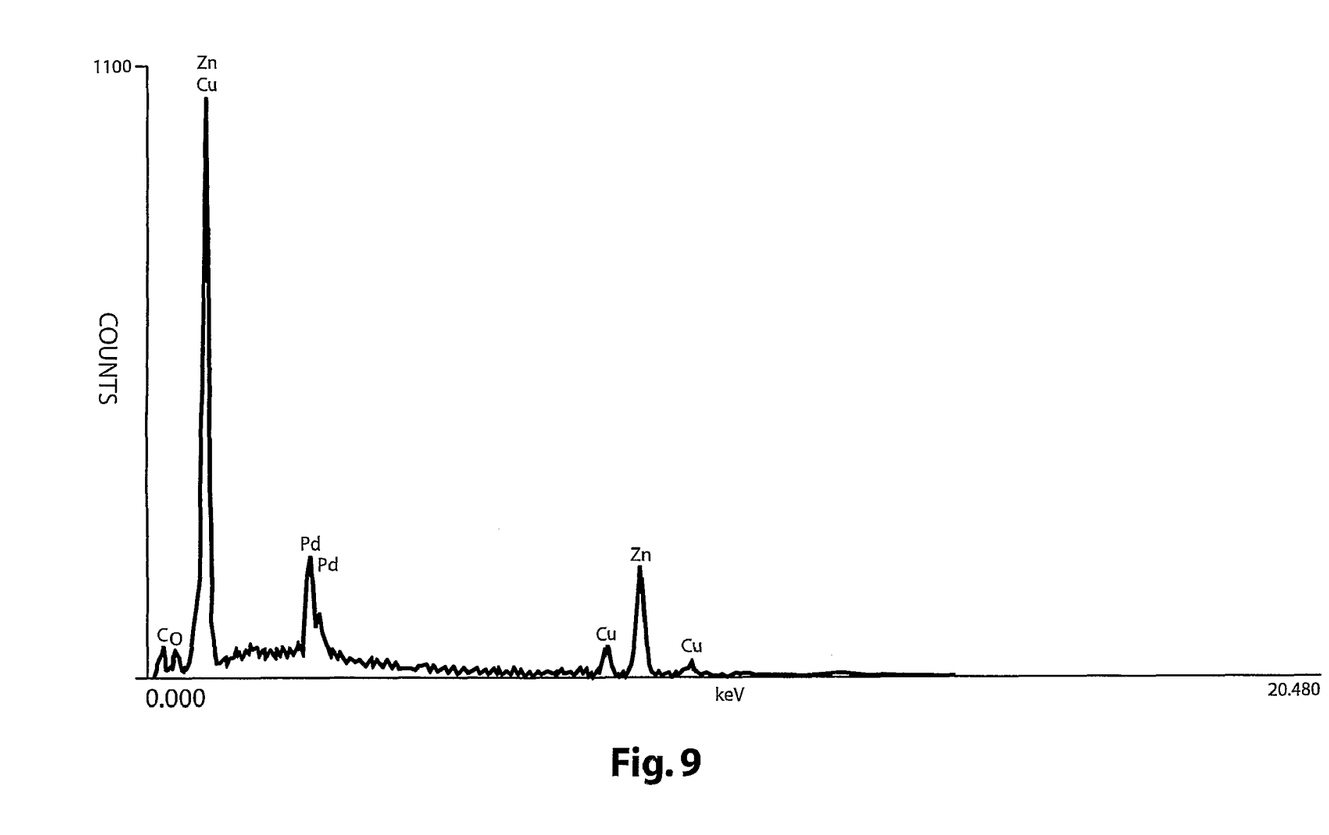
FIG. 9 is the energy dispersive x-ray analysis (EDAX) of the coating illustrated in FIG. 8.

FIG. 8 illustrates a cross section view of the wire produced in Example 2 as examined in a Scanning Electron Microscope (SEM). FIG. 9 illustrates the chemical composition of the coating, as analyzed by energy dispersive x-ray analysis (EDAX) on the SEM, is a nominal k-ratio of 84% Zn/16% Cu alloy. The Palladium content shown in FIG. 9 is a coating that is added in the process of performing the SEM analysis.

Since the processing occurred at a relatively low temperature for a relatively long time (compared to the time to cool to room temperature), the sample can be considered to be processed under equilibrium conditions. Universally accepted equilibrium phase diagrams for the binary system copper/zinc, e.g. *Constitution of Binary Alloys*, by Hansen et al., pp. 649-655, 1958, will identify a 84 Zn/16 Cu alloy phase as epsilon phase brass.

As can be seen from the foregoing description, drawing a zinc coated, copper bearing core wire to its finish size and then heat treating the wire at very low temperature provides an EDM wire with a substantially continuous epsilon phase brass coating while maintaining the mechanical properties of the core wire. The coating resulting from the diffusion anneal may be porous, allowing it to be infiltrated with graphite to further enhance its discharge properties. The resulting EDM wire electrode can equal the cutting speed of beta phase coatings and remain competitive with the cutting speed of gamma phase coatings at a lower manufacturing cost than either of the other high zinc phase coatings. It is also believed that the epsilon coating is ductile enough to allow cold drawing of the heat treated wire while maintaining a substantially continuous or discontinuous coating of epsilon phase brass.

The process of "skim cutting" to produce very accurate dimensional tolerances is an important aspect of many EDM jobs. During this process a considerably lower gap voltage is employed to remove small increments of the part being machined. In order to precisely control the "skim cut," the surface of the wire electrode employed should have be characterized by having a low and uniform thermionic work function. Alloys or discontinuous coatings of alloys will have more non-uniform thermionic work functions than those of unalloyed or lower alloy content materials. Therefore, unalloyed zinc and epsilon phase coatings (the lowest alloy content, i.e. copper percentage, of the brass phase alloys) will have very uniform thermionic work function characteristics. As such they will outperform standard brass (65 Cu/35 Zn or 63 Cu/37 Zn), beta phase brass (55 Cu/45Zn) coated wires, or gamma phase coated (35 Cu/65Zn which is discontinuous) wires in "skim pass" cuts.

While this invention has been described as having a preferred design, the present invention can be further modified within the spirit and scope of this disclosure. The appended claims are therefore intended to cover any variations, uses, or adaptations of the invention using its general principles as well as any departures from the present disclosure as come within known or customary practice in the art to which this invention pertains and which fall within the limits of the appended claims.

What is claimed is:

1. An electrode wire for use in a electric discharge machining apparatus, said wire comprising:
   a copper bearing core,
   a first coating disposed on said copper bearing core comprising gamma phrase brass; and
   a second coating disposed on said first coating having a zinc content greater than 80 percent zinc by weight.

2. The electrode wire of claim 1 wherein said first coating is comprised of gamma phase brass and said second coating is comprised of unalloyed zinc.

3. The electrode wire of claim 1 wherein said first coating is comprised of gamma phase brass and said second coating is comprised of epsilon phase brass.

4. The electrode wire of claim 1 wherein said core comprises brass.

5. The electrode wire of claim 4 wherein said brass comprises zinc in the range of 5% to 40% by weight.

6. The electrode wire of claim 1, wherein said core comprises a beta phase brass stratified layer on an alpha phase brass substrate.

7. The electrode wire of claim 1, wherein said core comprises a beta phase brass stratified layer on a mixed alpha/beta phase brass substrate.

8. The electrode wire of claim 1, wherein said core comprises a beta phase brass stratified layer on a copper substrate.

9. The electrode wire of claim 1, wherein said core comprises a copper clad steel.

10. The electrode wire of claim 1, wherein said core comprises a beta phase brass stratified layer on a copper clad steel substrate.

11. The electrode wire of claim 1 wherein said second coating is a substantially continuous coating covering substantially an entirety of said core outer surface.

12. The electrode wire of claim 1 wherein said first coating is discontinuous over said core outer surface.

13. A process for manufacturing an electrical discharge machining electrical wire, said process comprising:
   providing a copper bearing metal core wire;
   coating said core wire with zinc;
   heating said coated core at a temperature in the range of 50° C.-450° C. for a time period in the range of 3-50 hours until a coating of gamma phase brass is formed;
   cooling said wire;
   coating the composite wire so formed with zinc; and
   drawing said coated composite wire to its finish diameter.

14. An electrode wire for use in a electric discharge machining apparatus, said wire comprising:
   a core that includes copper in or near its outer surface;
   a discontinuous first coating disposed on said outer surface comprising an alloy layer phase having greater than 60 percent zinc by weight; and
   a continuous second coating disposed on said first coating and having greater than 60 percent zinc by weight.

15. The electrode wire of claim 14 wherein said second coating is epsilon phase brass.

16. The electrode wire of claim 14, wherein said core comprises brass.

17. The electrode wire of claim 16, wherein said brass comprises zinc in the range of 5% to 40% by weight.

18. The electrode wire of claim 14, wherein said core comprises a beta phase stratified layer on an alpha phase brass substrate.

19. The electrode wire of claim 14, wherein said core comprises a beta phase stratified layer on a copper substrate.

20. The electrode wire of claim 14, wherein said core comprises a copper clad steel.

21. The electrode wire of claim 14, wherein said core comprises a beta phase stratified layer on a copper clad steel substrate.

22. The electrode wire of claim 14, wherein said coating has been infiltrated with graphite.

23. The electrode wire of claim 14, wherein said second coating has greater than 80 percent zinc by weight.

24. The electrode wire of claim 14 wherein said second coating is unalloyed zinc.

25. A process for manufacturing an electrical discharge machining electrical wire, said process comprising:
   providing a copper bearing metal core wire;
   coating said core wire with a first coating of zinc;
   coating the composite wire so formed with a second coating of zinc;
   heating said coated core at a temperature in the range of 50° C.-140° C. for a time period in the range of 3-50 hours until said second coating of zinc forms epsilon phase brass; and
   cooling said wire.

26. The process of claim 25 wherein said step of coating said core is followed by a step of drawing said coated core wire to a finish diameter prior to said heating step.

* * * * *